Aug. 25, 1964     J. T. ROONEY     3,146,103
METHOD OF CONTACT PRINTING

Original Filed Jan. 23, 1957     2 Sheets-Sheet 1

INVENTOR.
JOHN T. ROONEY
BY
*Raymond A. Paquin*
ATTORNEY.

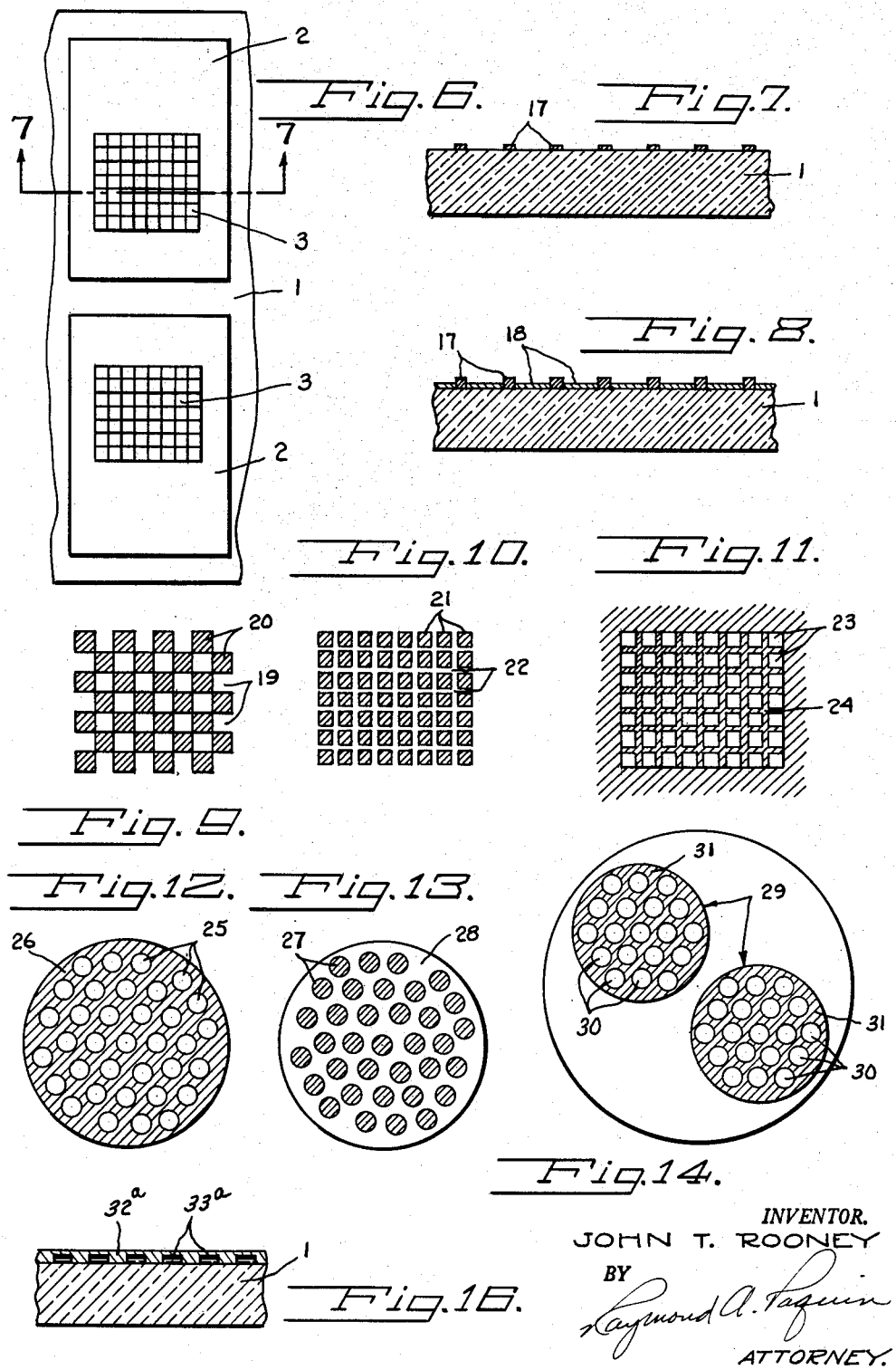

United States Patent Office 3,146,103
Patented Aug. 25, 1964

3,146,103
METHOD OF CONTACT PRINTING
John T. Rooney, P.O. Box 3284, West Palm Beach, Fla.
Continuation of application Ser. No. 635,896, Jan. 23, 1957. This application June 18, 1963, Ser. No. 289,779
3 Claims. (Cl. 96—27)

This invention relates to optical measuring or counting devices having designated areas such as the types known as reticules or stage micrometers, and especially those adapted to be used in conjunction with microscopes and known as stage micrometers and haemacytometers, or the like, and also to new and improved processes for making the same.

This application, is a continuation of my application Serial No. 635,896, filed January 23, 1957, now abandoned, which was a continuation in part of my application, Serial No. 245,353, filed September 6, 1951, now abandoned.

An object of the invention is to provide a new and improved optical measuring or counting device, or the like, having reference lines thereon, which lines are distinctly visible when viewed through a microscope.

Another object of the invention is to provide a new and improved optical measuring or counting device, or the like, wherein the reference lines, when viewed through the microscope, appear opaque or semi-opaque on a transparent or semi-transparent surface or field of view.

Another object of the invention is to provide a new and improved optical measuring or counting device, or the like, in which the necessity of reference or division lines is obviated, and to new and improved processes for forming the same.

Another object of the invention is to provide a new and improved optical measuring or counting device, or the like, wherein the reference or division lines are formed so as to be clearly visible and permanent and not affected by cleaning of the device.

Another object is to provide new and improved processes for forming optical measuring or counting devices, or the like, having either opaque or semi-opaque reference lines on a transparent or semi-transparent background or bright and distinct lines on a light transmitting, transparent, semi-transparent or colored background or lines of desired color on a background of contrasting color.

Other objects and advantages of the invention will be apparent from the following description taken in connection with the accompanying drawings. It will be understood that many changes may be made in the details of construction, arrangement of parts and steps of the process without departing from the spirit of the invention as expressed in the accompanying claims. I, therefore, do not wish to be limited to the exact details of construction and steps of the processes shown and described, as the preferred forms and processes have been given by way of illustration only.

Referring to the drawings:

FIG. 5 is a sectional view of a conventional apparatus illustrating one manner in which a metal may be deposited by the sputtering of the metal from a cathode in a glow discharge device;

FIG. 6 is a view generally similar to FIGS. 2, 3 and 4 but showing one form of the completed device;

FIG. 7 is a sectional view taken on line 7—7 of FIG. 6, looking in the direction of the arrows;

Figure 8:
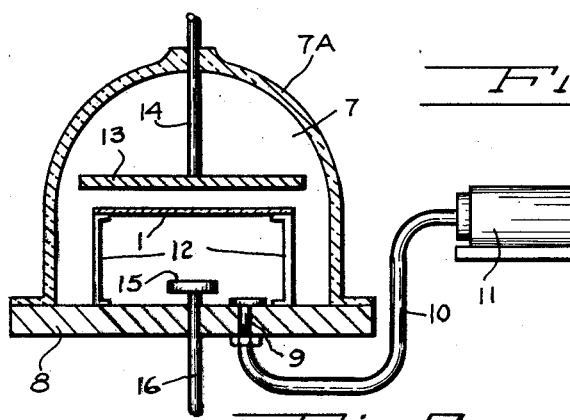
FIG. 8 is a sectional view similar to FIG. 7, but showing a modified form of the device.

FIGS. 9 to 15 inclusive show new patterns for stage micrometers or haemacytometers; and FIG. 16 is a view similar to FIGS. 7 and 8 but showing a further method of manufacture of the invention.

Figure 1:
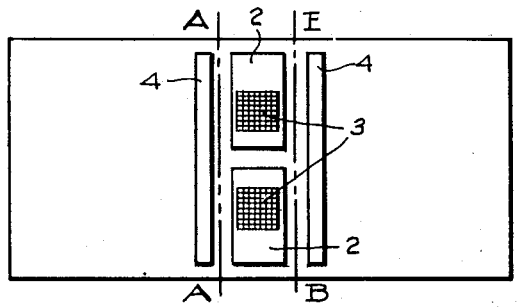
FIG. 1 is a top or plan view of an optical counting device of the haemacytometer type constructed in accordance with this invention.

Referring more particularly to the drawings wherein similar reference characters designate corresponding parts throughout the several views, the form of the invention shown in FIG. 1 comprises a plate or body portion 1 of glass or other suitable light transmitting material having the raised portions 2 each of which has a ruled or graduated area 3 and having the spaced elevated ribs 4 on either side of the raised portions 2, which ribs are slightly higher than the raised portions 2 and adapted to support a cover glass (not shown) which is placed over the specimen or object to be counted or examined, and provides a definite depth of the liquid such as blood which contains the objects such as blood cells which are to be counted.

While the entire surfaces of the raised portions could be provided with graduations or rulings in the same manner as the areas 3, it has been found unnecessary to do so because of the limited field that can be observed or viewed through the microscope.

The member and extent of the raised portions 2 may be such as desired depending upon the use which is to be made of the slide or device.

The plate or body portion 1, while it may be of desired light transmitting material and color, is preferably of a transparent optical material such as ordinary colorless optical crown glass but might be of transparent or semi-transparent material of desired color so long as it transmits sufficient light to allow the counting of objects placed thereon. Also, this body portion 1 could be formed of a colorless optical material with a film of desired color and transparency on either surface thereof, such as by spraying or placing thereon a colored glaze, the color of which might be chosen for the particular use to be made of the slide, for example, where the slide is to be used for counting blood cells, the film thereon, or body portion itself, could be green in color which being complementary to the red blood cells, the cells would appear black thus facilitating the counting thereof. This coating or the color or transparency of the base 1 or both might be such as to facilitate the observation of subjects viewed.

Figure 2:
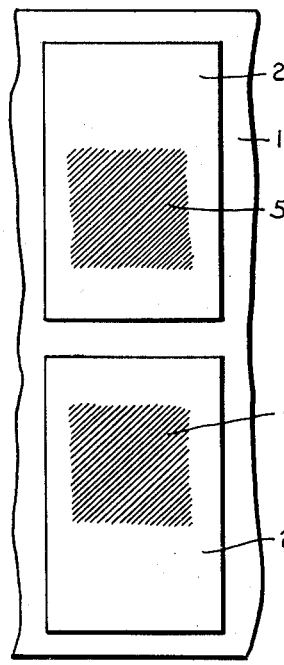
FIG. 2 is an enlarged fragmentary view of the portion of the device shown in FIG. 1 between lines A—A and B—B and illustrating a step in the process of manufacture of the device.
Figure 3:
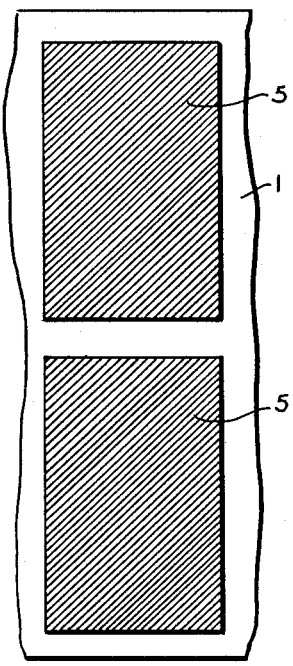
FIG. 3 is a view similar to FIG. 2 but showing an alternate step in the process of manufacture of the device.

To make my device, I first coat the portion 3 of the surface of the raised portions 2, which are to be graduated with a protective coating 5 of a wax or other suitable material. This protective coating can be placed only over the areas of the raised portions 2 to be graduated, as shown in FIG. 2, or can be placed over the entire surface of the raised portions 2, as shown in FIG. 3, or, if desired, such a protective coating could be placed over the entire surface of the raised portions 2 as shown in FIG. 3 and in addition thereto such coating could be placed over the entire surface of the body portion 1 or any desired portion thereof. In some cases this latter described coating over the entire upper surface of the body portion 1 as well as the entire area of the raised portions 2, will be preferable, as otherwise it would be necessary to apply some other form of mask or protection to the exposed areas of the surface of the body 1 and portions 2, as will be apparent from the following additional steps of the process.

Figure 4:
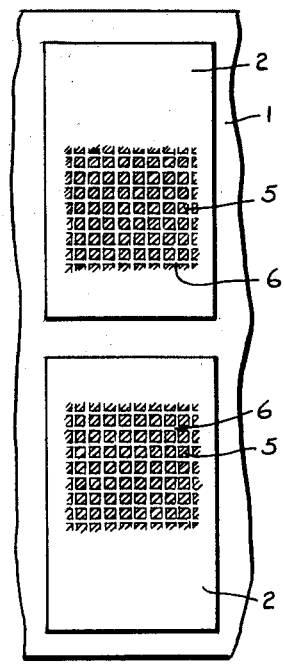
FIG. 4 is a view similar to FIG. 2 but showing a further step in the process of manufacture of the device.

Next, by employing a sharp tool, such as the usual haemacytometer ruling machine, the coating 5 of wax or other protective material may be removed from selected portions 6, as shown in FIG. 4, which are to form the graduations or division lines of the finished device. The graduation may or may not extend into the surface of the portions 2.

The body 1 may then be placed in a vacuum chamber 7 formed by a member such as the bell jar 7A which is removably sealed on the base 8 which has an opening 9 connected by the conduit 10 to the vacuum pump, or the like, 11, adapted to exhaust air from the vacuum chamber.

Within the vacuum chamber 7 is supported the base 1 by the supports 12 with the portions 2 and coated areas 5 with the exposed portions thereof 6 facing the cathode or plate 13 which may be of desired metal such as rhodium or other suitable metal and which is connected to the conductor 14 which extends through the bell jar 7A and is connected to a suitable source of electric current. Also in the vacuum chamber 7 but beneath the plate or body 1 is positioned the electrode 15 which is connected by the conductor 16 which extends through the base 8 to a suitable source of electric current.

When current is applied to the cathode 13 and electrode 15 through the conductors 14 and 16, while there is a partial vacuum in the vacuum chamber 7, there will be a glow discharge between the electrode 15 and the plate or cathode 13 and during this glow discharge there will be a sputtering or discharge of fine or colloidal particles of the metal from the cathode 13 and some of such particles will be deposited upon the coating on the plate 1 and some of such particles will enter the uncoated portions 6 and be deposited directly upon the plate 1. The density of such deposit or film may be regulated by regulation of the duration of the sputtering operation or other suitable manner.

The film of the metal on the exposed portions 6 may be such as to be semi-transparent, semi-opaque, or opaque depending upon the character of division lines desired.

Another process for making the device is through contact printing of the scale or checkerboard. While such a method for such fine work is not usually applicable or possible because of the scattering and deviation of the light passing from the master to the air film and again to the print, in this case a glass negative, as a master, would be brought in contact with the glass or sensitized surface of another chamber for the printing process, and immersion oil is placed between the surfaces to promote homogeneity for the path of the optical rays between the two surfaces, thus avoiding any scattering or deviation of the light rays and ensuring accuracy in the print. This is believed to constitute a great improvement in contact printing of all kinds where extreme accuracy is necessary and in many cases permit its use where it is not now considered feasible.

Other processes may be employed for depositing the metallic film on the exposed portions 6 such as chemical or electrochemical processes, or the coating of such areas with metal which has been evaporated in a vacuum, or a flux may be deposited in such exposed portions 6.

The remaining portions of the protective coating 5 may, or may not, then be removed by means of a suitable solvent and any other masking material also removed, which leaves the coating material in the portions or pattern 6, adhering to the portions 2 of the base 1 and then by heating the base 1 to the annealing range, the deposited metal film 17 is absorbed in the surface of the portions 2 or in the case of the flux, the flux is fused into the surface of the portions 2.

If it is desired to make opaque lines on a semi-opaque surface, a light film 18 of metal is first deposited on the surface of the portions 3 before applying the protective coating 5 and then after applying the protective coating 5 and forming the lines or portions 6 through said coating 5, an additional film, sufficient to be opaque, is deposited in the portions 5 on the first metal film from which the protective coating has been removed.

In the above manner a haemacytomer or the like can be produced which has semi-opaque or opaque division lines on a clear surface or opaque lines on a semi-transparent or semi-opaque surface.

Instead of cutting the division lines 6 with a sharp tool or ruling machine, as described above, the same construction could be accomplished photographically. In such case, instead of a wax protective layer 5, a sensitized coating could be applied either directly to the surfaces of the portions 3 or over the metal film 18. An image of the desired pattern for the rulings 6 can then be formed on such coated areas either by projection or a contact negative applied thereto, under suitable conditions well known in the photographic art, to produce the desired lines or pattern in the coating after proper treatment so that the metallic layer or flux 17 can be applied to the base 1 directly or on the metallic layer 18 in the above described manner, where the sensitized coating is removed and said metallic layer or flux 17 can be finally fixed in the surface by subsequent heat treatment as also previously described.

The use of the photographic process obviates the need for expensive ruling machines and attendants therefor with limited output and permits manufacture of such devices at considerably lower costs and with less waste from rejection.

It is also pointed out that by employing either the ruling or the photographic processes described, a type of haemacytometer can be made with bright or transparent lines in a semi-transparent or semi-opaque field by first placing a removable coating on the base, removing portions of said coating corresponding to the graduations or reference lines desired, then placing a second removable coating of material, removable by a different solvent on the portions of said base exposed by the removal of portions of said removable coating, then removing the remaining portions of said first removable coating with a solvent and applying to the base a film of desired color or density and then removing the second coating by use of a solvent.

This type of construction can also be made photographically by employing a sensitized coating as the first removable coating and by projection or contact printing forming the image of the pattern desired on the sensitized coating and then the process described above can be followed as respects protecting the pattern while treating the surface of the base member exposed by the removal of the remaining portions of the sensitized layer.

The film over the portion of the base exposed by removal of the remaining portions of the first removable coating or sensitized coating may consist of a glaze of desired color or may be formed by sputtering or vaporizing metal particles in a partial vacuum as previously described for forming the graduations or reference lines.

Subsequent heat treatment may be employed to fix the coating to the base member.

In FIGS. 9 to 14 inclusive there are shown a number of proposed patterns for haemacytometers or the like in which divisions of a specific area are alternately contrasting in intensity or color similar generally to a "checkerboard." In these examples, since no lines are necessary, the process already described, particularly the photographic process are readily applicable.

The pattern of such devices may consist of alternate squares, of one-four hundredth of a square millimeter in area as with the Neubaeur ruling or such areas may consist of small circles of such area.

In FIG. 9 there is shown a "checker-board" type of device with alternate light squares 19 and dark squares 20. This form has the advantage that it obviates the necessity for lines or rulings altogether.

In FIG. 10 there are shown groups of dark squares 21 on a light field or background 22.

FIG. 11 shows the reverse of FIG. 10, that is, groups of light squares 23 on a dark field or background 24.

FIG. 12 shows groups of light circles 25 on a dark background 26.

FIG. 13 shows groups of dark circles 27 on a light background 28.

FIG. 14 shows a circular device 32 comprising a plurality of circles each having groups of light circles on a dark background.

These light or dark squares or circles or other configuration may be delineated in close proximity to one another and, if desired, several may be placed in a larger outline.

These arrangements would provide simple constructions which are relatively economical to manufacture.

Figure 15:
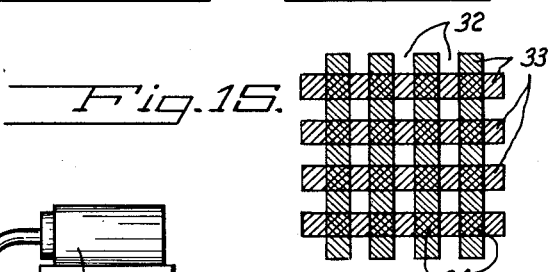

It is pointed out that another application of the dual coating arrangement and method is that stencils could be employed for forming the pattern. In the case of the small circles of one-four hundredth of a millimeter in diameter a simple stencil could be employed, but one coating being necessary. Squares could be formed by employing a stencil with lines in one direction only and then by turning the stencil 180 degrees, lines could be formed in a direction 180 degrees to the first lines. This would leave squares isolated and floating in a specified area. If, however, a first coating be applied before stencilling the lines in one direction and then a second coating be applied before stencilling in the second direction, there would result successive squares as follows: clear squares 32, semi-transparent squares 33 and less transparent squares 34, the first or clear squares having no film, the second having one film and the third having two films, as shown in FIG. 15.

In FIG. 16, there is illustrated a contact printing method of making the invention in which the glass negative 32a, as a master, is brought in contact with the sensitized surface on the base 1 for the printing process and immersion oil or the like is placed between the adjacent surfaces of the negative 32a and base 1 and particularly in the recesses or depressions 33a formed in the master 32a. This immersion oil promotes homogeneity for the path of the optical rays between the two surfaces, thus avoiding any scattering or deviation of the light rays and insuring accuracy in the print.

From the foregoing it will be seen that I have provided simple, efficient and economical means and processes for accomplishing all of the objects and advantages of the invention.

I claim:

1. In the process of making a microscope slide through contact printing, the step of placing immersion oil between depressions formed in the surface of the master and the surface on which the print is to be formed to promote homogeneity for the path of the optical rays between the two surfaces during the contact printing to neutralize the effect of scratches in said print.

2. In the method of forming the graduations of a microscope slide on a surface through contact printing, the steps of placing a contact print over the surface on which the graduations are to be formed, placing immersion oil between depressions formed in the adjacent surfaces of the contact print and the surface on which the graduations are to be formed to promote homogeneity for the path of the optical rays between the two surfaces during the contact printing to neutralize the effect of scratches in said print, and forming such graduations on said surface.

3. The process of forming a microscopic slide through contact printing comprising forming a base member, forming a master, an image of which is to be reproduced on said base member, contact printing an image of said master on said base member and placing immersion oil between depressions formed in the surface of said master and the surface on the base member to promote homogeneity for the path of the optical rays between the two surfaces during the contact printing and to neutralize the effect of scratches in said print.

References Cited in the file of this patent

UNITED STATES PATENTS

| | | |
|---|---|---|
| 1,922,434 | Gundlach | Aug. 15, 1933 |
| 1,994,483 | Ott | Mar. 19, 1935 |
| 2,073,287 | Sandvik | Mar. 9, 1937 |
| 2,389,504 | Guellich | Nov. 20, 1945 |
| 2,447,836 | Beeber et al. | Aug. 24, 1948 |

OTHER REFERENCES

Wolbarst: Modern Photography, vol. 18, No. 10, October 1954, pages 74, 75 and 116–118.